(12) United States Patent
Kitamori et al.

(10) Patent No.: US 8,851,808 B2
(45) Date of Patent: Oct. 7, 2014

(54) DRILL HAVING MULTIPLE FLANKS

(75) Inventors: Kazunori Kitamori, Toyama (JP); Toru Sekiguchi, Toyama (JP)

(73) Assignee: Nachi-Fujikoshi Corp., Toyama-shi (JP)

( * ) Notice: Subject to any disclaimer, the term of this patent is extended or adjusted under 35 U.S.C. 154(b) by 282 days.

(21) Appl. No.: 13/297,404

(22) Filed: Nov. 16, 2011

(65) Prior Publication Data
US 2012/0121350 A1 May 17, 2012

(30) Foreign Application Priority Data

Nov. 17, 2010 (JP) ................................ 2010-256431

(51) Int. Cl.
B23B 51/02 (2006.01)

(52) U.S. Cl.
CPC .............. *B23B 51/02* (2013.01); *B23B 2251/14* (2013.01); *B23B 2222/04* (2013.01); *B23B 2251/04* (2013.01); *B23B 2226/275* (2013.01)
USPC ........................................................ 408/230

(58) Field of Classification Search
USPC .................. 408/223, 224, 227, 228, 229, 230
See application file for complete search history.

(56) References Cited

U.S. PATENT DOCUMENTS

| 2,193,186 | A | * | 3/1940 | Bannister | 408/223 |
| 4,605,347 | A | * | 8/1986 | Jodock et al. | 408/224 |
| 4,620,822 | A | * | 11/1986 | Haque et al. | 408/224 |
| 5,442,979 | A | * | 8/1995 | Hsu | 76/108.6 |
| 6,652,203 | B1 | * | 11/2003 | Risen, Jr. | 408/225 |
| 7,520,703 | B2 | * | 4/2009 | Rompel | 408/225 |
| 8,206,067 | B2 | * | 6/2012 | Turrini | 408/1 R |
| 2003/0202853 | A1 | * | 10/2003 | Ko et al. | 408/225 |
| 2005/0053438 | A1 | * | 3/2005 | Wetzl et al. | 408/225 |
| 2006/0056930 | A1 | * | 3/2006 | Rompel | 408/225 |

FOREIGN PATENT DOCUMENTS

| FR | 2829715 A1 | * | 3/2003 |
| JP | 2004082302 A | | 3/2004 |
| JP | 4120319 B2 | | 7/2008 |

* cited by examiner

*Primary Examiner* — Eric A Gates
*Assistant Examiner* — Paul M Janeski
(74) *Attorney, Agent, or Firm* — Harness, Dickey & Pierce, P.L.C.

(57) ABSTRACT

A drill capable of suppressing inter-layer peeling (delamination) while keeping hole diameter accuracy even if the number of holed to be worked increases is provided. The drill includes a first flank which has a ridge line forming a cutting edge, a second flank which is adjacent to the first flank and has a ridge line forming a land portion, and a third flank which is adjacent to the first flank and has a ridge line forming a chisel edge. The drill further includes a fourth flank which is surrounded by a ridge line forming the first flank, a ridge line forming the third flank, and a trough line forming the second flank.

5 Claims, 4 Drawing Sheets

DRILL HAVING MULTIPLE FLANKS

BACKGROUND OF THE INVENTION (1) Field of the Invention

The present invention relates to a drill mainly used for drilling of carbon fiber reinforced plastic (CFRP) and the like.

(2) Description of Related Art

When drilling of components (members) used for automobiles, aircrafts and the like is performed, various drills are used depending on materials of the components. If a work material is made of metal such as aluminum, the drill is required to have ability not to adhere to the work material in order to prevent clogging of swarf. Further, if the work material is a high-density fiber material such as CFRP, the drill is required to have ability to suppress occurrence of inter-layer peeling and a burr due to a fiber material in order to secure accuracy of the drilled hole.

For example, Japanese Patent No. 4120319 discloses that a flank of a drill is configured by a first flank including a cutting edge, a second flank formed on a rear side of the first flank in a rotational direction, a third flank including a chisel edge, and a fourth flank consisting of a step surface formed between the second flank and the third flank, and the fourth flank increases toward an outer peripheral direction, so that adhesion of a work material and the drill due to cutting heat is prevented when the work material is made of an alloy of aluminum or the like. FIG. 4 shows an enlarged perspective view of a tip end portion of the drill.

BRIEF SUMMARY OF THE INVENTION

However, as shown in FIG. 4, because the drill 1' disclosed in Japanese Patent No. 4120319 has a fourth flank 23 which increases toward an outer peripheral direction in order to enhance the property of discharging swarf, and a first flank 20 defines boundaries (ridge lines) only with respect to a second flank 21 and a third flank 22, frictional heat generated in the first flank 20 is released only from the second flank 21 and the third flank 22 besides the first flank 20. Accordingly, when the drill does not have an oil hole, the work material is a high-density fiber material such as CFRP, and cutting work is performed only with air blow, there has been the problem that it is difficult to ensure accuracy of the hole diameter of the work material when the frictional heat generated in the first flank 20 surpasses the heat release amount, and finally inter-layer peeling (delamination) is caused.

Further, when the drill diameter is small, a skilled working (manufacturing) technique using a grindstone with a very small tip end is required for making the clearance angle of the third flank 22 larger than that of the second flank 21 (or for providing a step surface between the second flank 21 and the third flank 22), and therefore there has been the problem that it is difficult to secure the dimensional quality of drills which are needed to be produced in large quantities.

Accordingly, in view of the above described problems, it is an object of the present invention to provide a drill capable of suppressing inter-layer peeling (delamination) while keeping the hole diameter accuracy even if the number of worked holes is increased. Further, it is also an object to provide a drill which is easily manufactured even with a conventional grindstone.

In order to achieve the above objects, the present invention provides a drill including a first flank which has a ridge line forming a cutting edge, a second flank which is adjacent to the first flank and has a ridge line forming a land portion, and a third flank which is adjacent to the first flank and has a ridge line forming a chisel edge, wherein the drill further includes a fourth flank which is surrounded by a ridge line forming the first flank, a ridge line forming the third flank and a trough line forming the second flank. In this drill, the first flank is in contact with not only the second flank and the third flank but also the fourth flank via the ridge line shared by the first flank and the fourth flank, and therefore the frictional heat generated in the first flank can be quickly released also from the fourth flank. Hereinafter, the first to the fourth flanks which constitute the flanks of the drill according to the present invention will be described.

The first flank is a flank which has the ridge line forming the cutting edge of the drill according to the present invention, and corresponds to a part which is simply called "flank" in an ordinary drill. Adjacent to the first flank, the second flank through the fourth flank which will be described later are formed on a rear side thereof in the rotational direction of the drill via boundaries (ridge lines). The clearance angle (first clearance angle) of the first flank is set at 5 to 10 degrees inclusive. The reason why the first clearance angle is limited is that if the first clearance angle is less than 5 degrees, frictional resistance is likely to occur between the first flank and the work material with large surface roughness, and if the clearance angle is more than 10 degrees, the rigidity of the cutting edge reduces and chipping easily occurs.

The second flank is a flank which is formed next to the first flank on the rear side of the first flank in the rotational direction of the drill, and has the ridge line forming the land portion. It should be noted that a ridge line shared by the second flank and the first flank differs from a ridge line extending from a chisel point to an outer peripheral side. More specifically, the ridge line shared by the third flank which will be described later and the first flank is the same as the ridge line extending from the chisel point to the outer peripheral side, but differs from the ridge line shard by the second flank and the first flank. Further, the clearance angle (second clearance angle) of the second flank is set at 20 to 30 degrees inclusive. The reason why the second clearance angle is limited is that if the second clearance angle is less than 20 degrees, chipping easily occurs due to reduction in the rigidity of a first cutting edge, and if the second clearance angle is more than 30 degrees and is larger than that of the third flank which will be described later, the frictional resistance between the second flank and the work material is likely to increase as a result of occurrence of difference in level between the second flank and the third flank on the rear side in the rotational direction of the drill.

The third flank is a flank which is formed next to the first flank on the rear side of the first flank in the rotational direction of the drill, and has the ridge line forming the chisel edge. The ridge line shared by the third flank and the first flank is the same as the ridge line extending to the outer peripheral side from the chisel point. Further, there is the difference in level between the third flank and the second flank, and the difference surface (step surface) forms the fourth flank which will be described later. Further, the clearance angle of the third flank (third clearance angle) is set at 20 to 30 degrees inclusive similarly to the second clearance angle. The reason why the third clearance angle is limited is that if the third clearance angle is less than 20 degrees, the property of discharging chips is impaired, and if the third clearance angle is more than 30 degrees, the rigidity of the cutting edge at the tip end portion of the drill becomes small, so that chipping is likely to occur in the vicinity of the chisel edge.

The fourth flank is a flank which is surrounded by the ridge lines which constitute the first and third flanks respectively and the trough line which constitutes the second flank. Further, the fourth flank is the difference surface between the first and third flanks and the second flank, and therefore intersects perpendicular to the first to third flanks. The width of the fourth flank (the difference width between the second flank and the third flank) becomes smaller toward the outer periphery direction of the drill of the present invention. The fourth flank is in contact with the first flank via the ridge line shared by the fourth flank and the first flank, and therefore, the frictional heat generated in the first flank can be quickly released.

Further, in the invention according to claim 2, there is provided the drill in which the width of the fourth flank that is the width of the difference in level between the second flank and the third flank becomes narrower toward the outer periphery direction of the drill according to the present invention, and a ridge line forming an outermost periphery of the second flank continuously connects to a ridge line forming an outermost periphery of the third flank without difference in level. According to this configuration, when the work material is a high density fiber material such as CFRP, drill penetration at the time of completion of cutting work becomes smooth.

In the drill according to the present invention, the second flank and the fourth flank are formed by grinding them by pressing an ordinary drill to a corner portion of a grindstone by a predetermined dimension from the land portion side, and therefore, production of the drill is easy.

As described above, in the present invention, by using a drill including a first flank which has a ridge line forming a cutting edge, a second flank which is adjacent to the first flank and has a ridge line forming a land portion, and a third flank which is adjacent to the first flank and has a ridge line forming a chisel edge, wherein the drill further includes a fourth flank which is surrounded by a ridge line forming the first flank, a ridge line forming the third flank and a trough line forming the second flank, the frictional heat generated in the first flank can be quickly released via the fourth flank, and therefore, the effect of being capable of suppressing inter-layer peeling (delamination) while keeping the hole diameter accuracy of the work material can be provided.

Further, because the drill according to the present invention can be easily produced by grinding an ordinary drill by pressing it to a corner portion of an ordinary grindstone by a predetermined dimension from a land portion side to form the second flank and the fourth flank, a skilled working (producing) technique using a grindstone with a very small tip end is not required, and the dimensional quality of drills which are needed to be produced in large quantities can be satisfied.

DETAILED DESCRIPTION OF THE INVENTION

Figure 1:
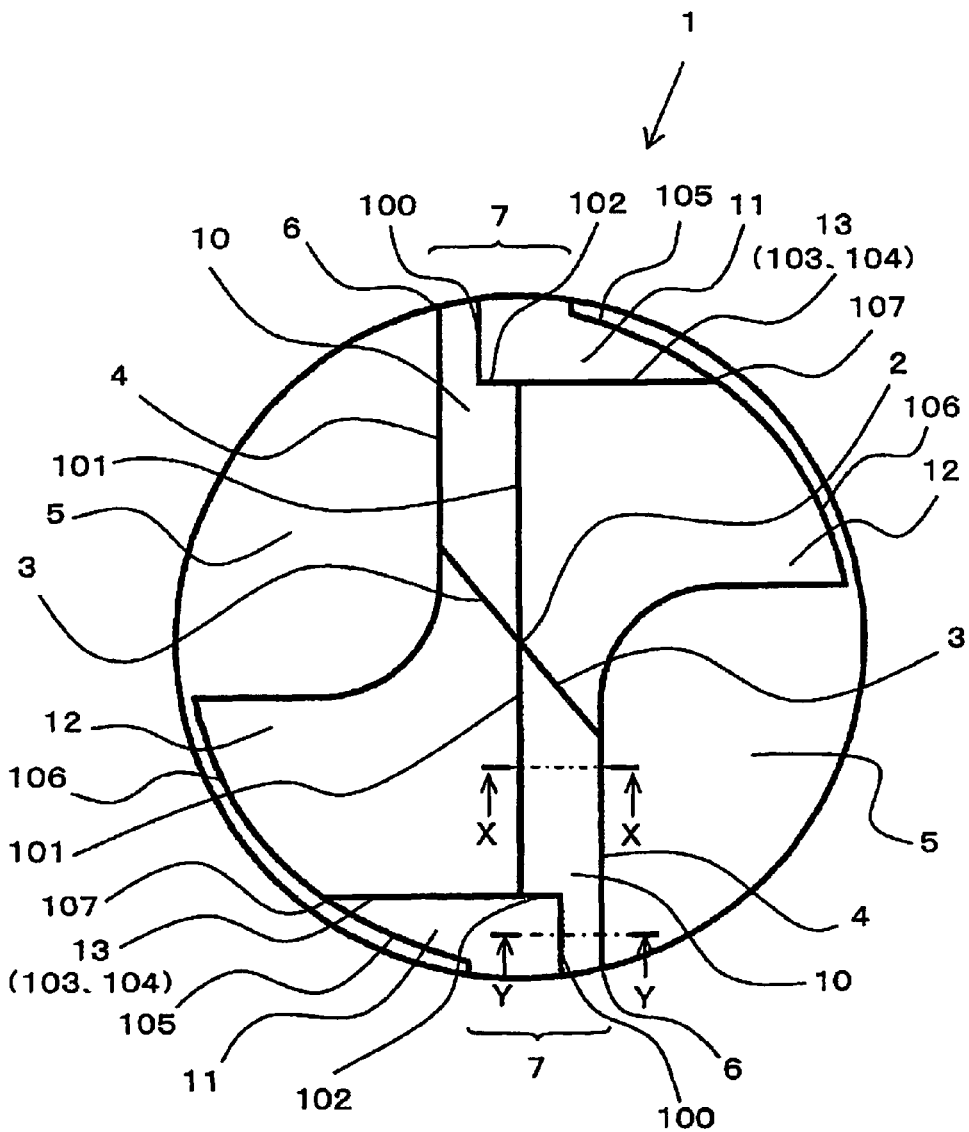
FIG. 1 is a front view of a drill which is one example of an embodiment of the present invention.
Figure 2:
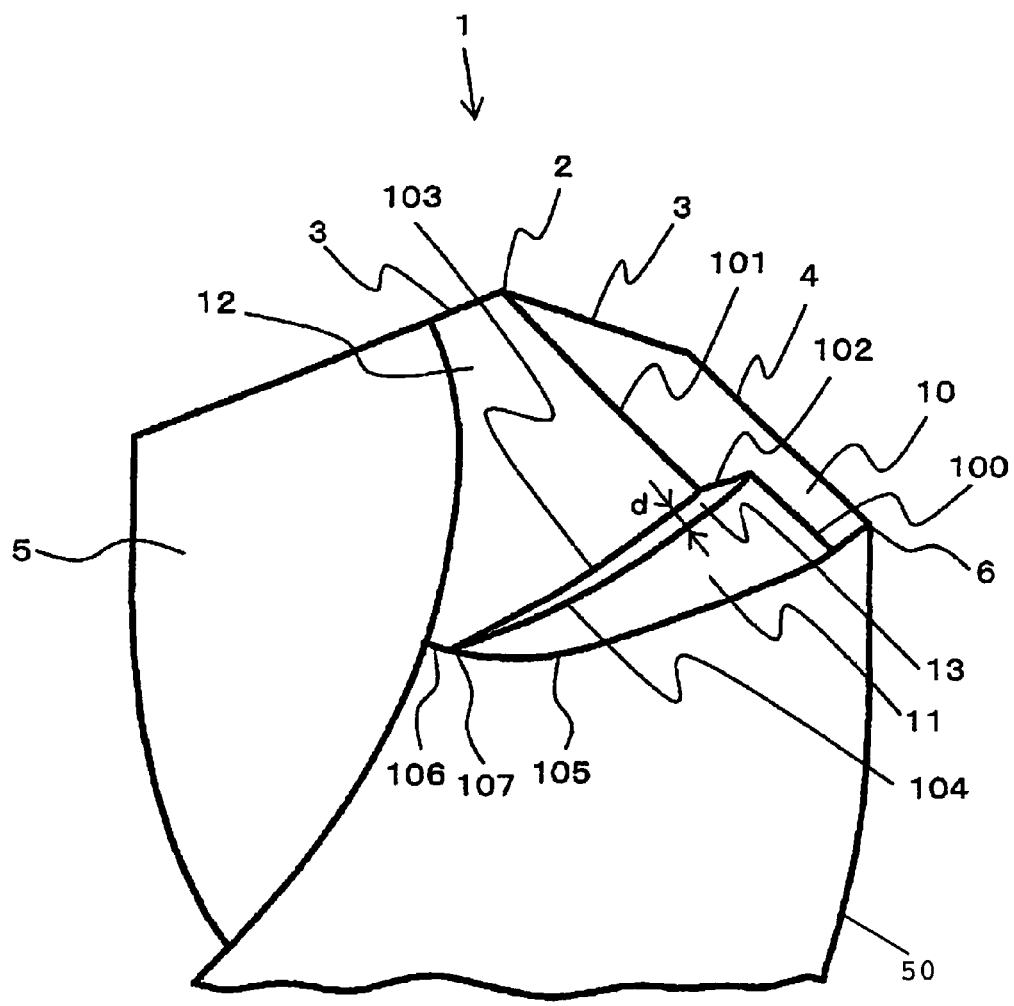
FIG. 2 is an enlarged perspective view of a tip end portion of the drill of FIG. 1.
Figure 3A:
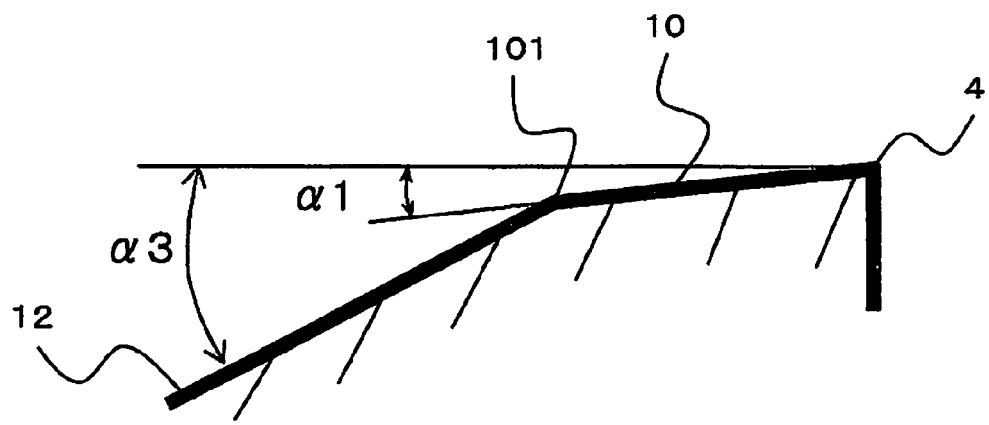
FIG. 3A is a sectional view taken along the X-X line in FIG. 1 and seen from the direction of the arrows in FIG. 1.
Figure 3B:
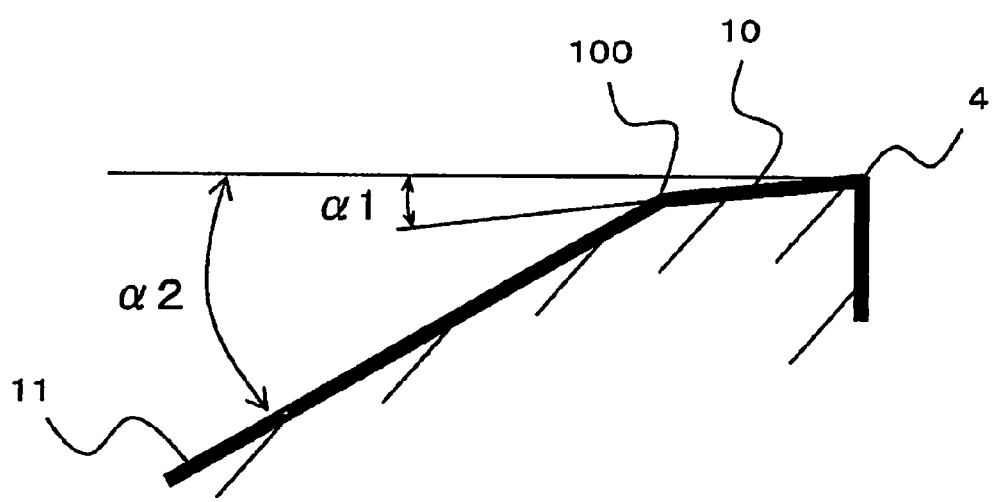
FIG. 3B is a sectional view taken along the Y-Y line in FIG. 1 and seen from the direction of the arrows in FIG. 1.
Figure 4:
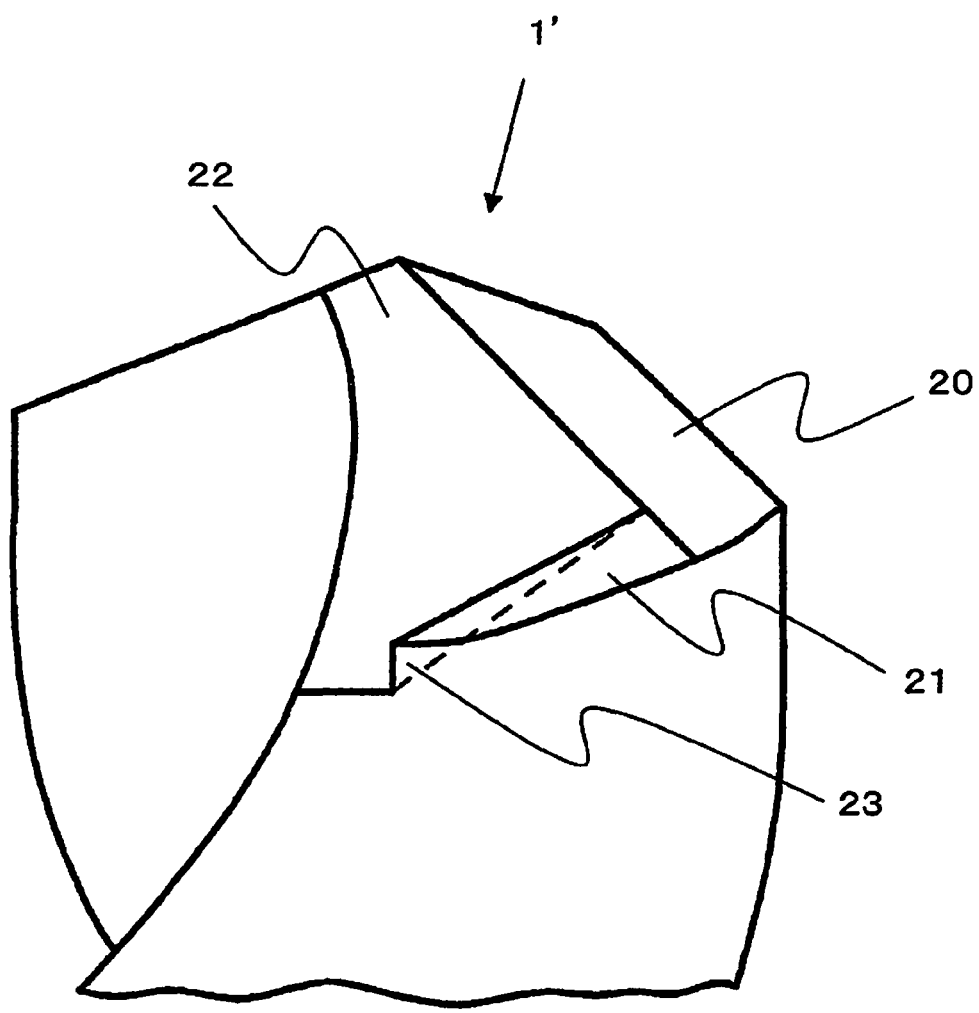
FIG. 4 is an enlarged perspective view of a tip end portion of a conventional drill.

An embodiment of the present invention in which a drill 1 according to the present invention is applied to a twist drill having two spiral flutes will be described with reference to the drawings. FIG. 1 is a front view of the drill 1 which is one example of the embodiment of the present invention. FIG. 2 is an enlarged perspective view of a tip end portion of the drill 1 of FIG. 1. FIG. 3A is a sectional view taken along the X-X line in FIG. 1 and seen from the direction of the arrows on FIG. 1. FIG. 3B is a sectional view taken along the Y-Y line in FIG. 1 and seen from the direction of the arrows in FIG. 1.

As shown in FIGS. 1 and 2, the drill 1 having two spiral flutes 5 and 5 has a cutting edge 4 which is a ridge line extending from a chisel edge 3 including a chisel point 2 corresponding to a tip end portion of the drill. An outer peripheral corner 6 is formed at an intersection point of the cutting edge 4 and an outer periphery of the drill 1. Further, a flank of the drill 1 is constituted by a first flank 10, a second flank 11, a third flank 12 and a fourth flank 13. As such, the flanks are formed on the tip end portion of a drill body 50.

The first flank 10 is a flank having a ridge line which forms the cutting edge 4 of the drill 1 according to the present invention. Further, next to the first flank 10, the second flank 11, the third flank 12 and the fourth flank 13 are continuously formed on a rear side in a rotational direction of the drill 1 via boundary portions (ridge lines).

The second flank 11 is a flank which is formed next to the first flank 10 on the rear side of the flank 10 in the rotational direction of the drill 1, and has a ridge line forming a land portion 7 of the drill 1. It should be noted that a ridge line 100 shared by the second flank 11 and the first flank 10 differs from a ridge line 101 which extends from the chisel point 2 to an outer peripheral side. More specifically, the ridge line 101 shared by the third flank 12 and the first flank 10 is the same as the ridge line 101 which extends from the chisel point 2 to the outer peripheral side, but is different from the ridge line 100 shared by the second flank 11 and the first flank 10.

The third flank 12 is a flank which is formed next to the first flank 10 on the rear side of the first flank 10 in the rotational direction of the drill 1, and has a ridge line forming the chisel edge 3. The ridge line 101 shared by the third flank 12 and the first flank 10 is the same as the ridge line 101 which extends from the chisel point 2 to the outer peripheral side. Further, there is a step (difference in level) between the third flank 12 and the second flank 11, and a step surface (difference surface) thereof forms the fourth flank 13.

The fourth flank 13 is a flank which is surrounded by a ridge line 102 and a ridge line 103 which constitute the first flank 10 and the third flank 12, respectively, and a trough line 104 which constitutes the second flank 11. The fourth flank 13 also corresponds to the step surface between the second flank 11 and the third flank 12, and therefore intersects the second flank 11 and the third flank 12 perpendicularly. The width d of the fourth flank (the step width between the second flank 11 and the third flank 12) becomes narrower toward the outer peripheral direction of the drill 1, so that the ridge line 103 shared by the third flank 12 and the fourth flank 13, and the trough line 104 shared by the second flank 11 and the fourth flank 13 intersect each other at an intersection point 107.

Further, as shown in FIG. 3A, a clearance angle (first clearance angle) α1 of the first flank is set at 5 to 10 degrees inclusive, a clearance angle (third clearance angle) α3 of the third flank is set at 20 to 30 degrees inclusive, and a clearance angle (second clearance angle) α2 of the second flank is also set at 20 to 30 degrees as shown in FIG. 3B. When the third clearance angle α3 is larger than the second clearance angle α2, the ridge line 105 forming the outermost periphery of the second flank 11 is continuously connected to a ridge line 106 forming the outermost periphery of the third flank 12 without difference in level.

EXAMPLE

In order to confirm the influence on a work material after cutting work using the drill according to the present invention (hereinafter, called the present invention product) and a conventional drill (hereinafter, called a conventional product), a cutting test was performed under the following conditions. The result will be described by using Table 1 to Table 3. The drills (the present invention product and the conventional product) which were used in the present cutting test have the common specification in which the drill diameter is 6.796 mm, the drill length is 80 mm, the flute length is 36 mm, the helix angle is 26°, the tip end angle is 90°, and the shank diameter is 7 mm. Further, the present invention product is a drill with an oil hole in which the first clearance angle is 7.5°, the second clearance angle is 25° and the third clearance angle is 25°, and the conventional product is a drill with an oil hole in which the angle of the second flank (corresponding to the first clearance angle of the present invention product) is 7.5°, and the angle of the third flank (corresponding to the third clearance angle of the present invention product) is 25°.

In the present cutting test, cutting work was performed under the following conditions by using two kinds of drills of the present invention product and the conventional product until each of the worked holes reaches the depth of 12.5 mm. At the same time, observation of the cut holes and observation of the abrasion states in respective portions of the drills were performed once every 100 holes from the 100$^{th}$ hole through the 600$^{th}$ hole in the cumulative number of worked holes.

Cutting speed: 120 mm/min
Feeding amount of drill: 0.38 mm/rev
Feeding speed of drill: 2128 mm/min
Revolution speed of drill: 5600 min$^{-1}$
Work material: CFRP (carbon fiber reinforced plastic)
Cutting oil: none (air blow 0.5 MPa)

Table 1 shows the observation result of the abrasion states, when the cutting test was performed using the present invention product, of the respective portions of a chisel edge, a cutting edge, an outer peripheral corner, a margin, a rake face and a thinning were observed once every 100 holes until the cumulative number of worked holes reaches 600. Table 2 shows the observation result in the case of using the conventional product. "○" in the table indicates that a damage such as chipping was not confirmed in the respective observed portions described above after the cutting test, and "x" indicates that a damage such as chipping was confirmed at the respective observed portions described above after the cutting test. Further, "–" in the table indicates that observation was not able to be performed because a trouble occurred in the drill and the cutting test was not able to be continued.

TABLE 1

| | | \multicolumn{6}{c}{OBSERVED PORTIONS} | | | | |
|---|---|---|---|---|---|---|---|
| | | CHISEL EDGE | CUTTING EDGE | OUTER PERIPHERAL CORNER | MARGINE | RAKE FACE | THINNING |
| CUMULATIVE NUMBER OF WORKED HOLES | 100 | ○ | ○ | ○ | ○ | ○ | ○ |
| | 200 | ○ | ○ | ○ | ○ | ○ | ○ |
| | 300 | ○ | ○ | ○ | ○ | ○ | ○ |
| | 400 | ○ | ○ | ○ | ○ | ○ | ○ |
| | 500 | ○ | ○ | x | x | ○ | ○ |
| | 600 | ○ | ○ | x | x | ○ | ○ |

○: with no damage,
x: with damage

TABLE 2

| | | \multicolumn{6}{c}{OBSERVED PORTIONS} | | | | |
|---|---|---|---|---|---|---|---|
| | | CHISEL EDGE | CUTTING EDGE | OUTER PERIPHERAL CORNER | MARGINE | RAKE FACE | THINNING |
| CUMULATIVE NUMBER OF WORKED HOLES | 100 | x | x | x | x | x | x |
| | 200 | — | — | — | — | — | — |
| | 300 | — | — | — | — | — | — |
| | 400 | — | — | — | — | — | — |
| | 500 | — | — | — | — | — | — |
| | 600 | — | — | — | — | — | — |

○: with no damage,
x: with damage

As shown in Table 1, in the present invention product, a damage such as chipping was not observed in any of the respective portions of the chisel edge, the cutting edge, the outer peripheral corner, the margin, the rake face and the thinning until the cumulative number of worked holes reaches 400. However, when the cumulative number of worked holes reaches 500, chipping occurred in the outer peripheral corner and the margin, so that damages were confirmed. Further, when the cumulative number of worked holes reaches 600, damages were confirmed also in the outer peripheral corner and the margin, but no damage was confirmed in the other observed portions (the chisel edge, the rake edge, the cutting face and the thinning).

In contrast with this, in the conventional product, significant chipping occurred in all portions of the chisel edge, the cutting edge, the outer peripheral corner, the margin, the rake face and the thinning when the cumulative number of worked holes reaches 100, and therefore, the cutting test was not able to be continued. Accordingly, observation of the respective portions after the $200^{th}$ hole in the cumulative number of worked holes was not able to be performed.

Next, Table 3 shows the result of measuring the inter-layer peeling (delamination) amounts of the worked holes (penetrated side) once every 100 holes from the $100^{th}$ hole through the $600^{th}$ hole in the cumulative number of worked holes in the cutting tests using the present invention product and the conventional product. Measurement of the inter-layer peeling amount was performed by measuring the longest length from the outer peripheral edge of the worked hole to the position where the inter-layer peeling can be confirmed by using a magnifying glass such as a microscope.

TABLE 3

| | | INTER-LAYER PEELING AMOUNT (mm) | |
| --- | --- | --- | --- |
| | | PRESENT INVENTION PRODUCT | CONVENTIONAL PRODUCT |
| CUMULATIVE | 100 | 0.41 | 0.41 |
| NUMBER OF | 200 | 0.43 | — |
| WORKED | 300 | 0.47 | — |
| HOLES | 400 | 0.49 | — |
| | 500 | 0.34 | — |
| | 600 | 0.35 | — |

As shown in Table 3, it was found out that in the cutting test using the present invention product, the inter-layer peeling amount increased in association with increase in the cumulative number of worked holes in such a manner that the inter-layer peeling amounts are 0.41 mm in the $100^{th}$ hole, 0.43 mm in the $200^{th}$ hole, 0.47 mm in the $300^{th}$ hole, and 0.49 mm in the $400^{th}$ hole. However, the inter-layer peeling amount was 0.34 mm in the $500^{th}$ hole in the cumulative number of worked holes, and 0.35 mm in the $600^{th}$ hole, and therefore the inter-layer peeling amount becomes smaller with increase in the cumulative number of worked holes. It should be noted that the hole diameter accuracy of all worked holes of which the inter-layer peeling amounts were measured, from the $100^{th}$ hole through the $600^{th}$ hole, was in an allowable range with respect to the drill diameter (6.796 mm).

Concerning the present invention product, the reason why the inter-layer peeling amount became small after the $500^{th}$ hole in the cumulative number of worked holes is not clear, however, even though chipping occurred in the outer peripheral corner and the margin in the $500^{th}$ hole in the cumulative number of worked holes as shown in Table 1, the influence on the inter-layer peeling amount of the work material was not confirmed, and the inter-layer peeling amount rather became smaller as the cumulative number of worked holes increased more. In view of this, it is conceivable that in the present invention product, because the first flank having the cutting edge was in contact with the fourth flank, and the frictional heat generated between the work material and the cutting edge was able to be quickly released through the fourth flank, development of the inter-layer peeling was able to be suppressed consequently while keeping the hole diameter accuracy even when the cumulative number of worked holes increased.

In contrast with this, in the cutting test using the conventional product, the inter-layer peeling amount was 0.41 mm in the $100^{th}$ hole in the cumulative number of worked holes, but the cutting test was not able to be continued due to occurrence of significant chipping in all portions of the chisel edge, the cutting edge, the outer peripheral corner, the margin, the rake surface and the thinning as shown in Table 2, and therefore, the inter-layer peeling amount was not able to be measured.

From the above results, by using the drill according to the present invention, that is, the drill including the first flank which has the ridge line forming the cutting edge, the second flank which is formed next to the first flank and has the ridge line forming the land portion, and the third flank which is formed next to the first flank and has the ridge line forming the chisel edge, wherein the drill further includes the fourth flank which is surrounded by the ridge lines forming the first flank and the third flank, respectively, and the trough line forming the second flank, the frictional heat generated in the first flank can be quickly released via the fourth flank, and therefore, inter-layer peeling can be suppressed while keeping the hole diameter accuracy of the work material.

The invention claimed is:

1. A drill comprising: a first flank, a second flank, a third flank and a fourth flank formed on a tip end portion of a drill body, wherein the first flank includes a first ridge line and a second ridge line forming a cutting edge; the second flank is adjacent to the first flank via a third shared ridge line and includes a fourth ridge line forming a land portion, the second flank being directly adjacent to a rear side of the first flank in a rotational direction of the drill; the third flank is adjacent to the first flank via the first ridge line on the rear side of the first flank in the rotational direction of the drill, and includes a fifth ridge line forming a chisel edge; and the fourth flank is surrounded by a sixth ridge line defining the first flank, a seventh ridge line defining the third flank and a trough line defining the second flank.

2. The drill according to claim 1, wherein an axial distance between the second flank and the third flank decreases in a radial direction toward an outer periphery of the drill, and the fourth ridge line is continuously connected to an eighth ridge line defining an outermost periphery of the third flank.

3. The drill according to claim 1, wherein the second flank is immediately adjacent to the first flank via the third shared ridge line.

4. The drill according to claim 1, wherein the fourth flank is located on the rear side of the first flank in the rotational direction of the drill.

5. A drill comprising: a first flank, a second flank, a third flank and a fourth flank formed on a tip end portion of a drill body, wherein the first flank includes a first ridge line and a second ridge line forming a cutting edge; the second flank is directly adjacent to a rear side of the first flank via a third shared ridge line and includes a fourth ridge line forming a land portion; the third flank is adjacent to the first flank via the first ridge line on a rear side of the first flank in a rotational direction of the drill, and includes a fifth ridge line forming a chisel edge; and the fourth flank is surrounded by a sixth ridge line defining the first flank, a seventh ridge line defining the third flank and a trough line defining the second flank, the fourth flank being located on the rear side of the first flank in the rotational direction of the drill.

* * * * *